United States Patent [19]

Pailler

[11] Patent Number: 4,755,886
[45] Date of Patent: Jul. 5, 1988

[54] APPARATUS FOR PROCESSING VOUCHERS INCLUDING A HIGH DENSITY MAGNETIC RECORD

[75] Inventor: Alain L. Pailler, Bourg La Reine, France

[73] Assignee: Electronique Serge Dassault, Paris, France

[21] Appl. No.: 810,056

[22] Filed: Dec. 17, 1985

[30] Foreign Application Priority Data

Apr. 18, 1985 [FR] France ................. 85 05894

[51] Int. Cl.$^4$ .................. G11B 25/04; G11B 19/20
[52] U.S. Cl. ............................. 360/2; 360/88
[58] Field of Search .............. 360/2, 88, 51, 43; 235/449; 101/93.04

[56] References Cited

U.S. PATENT DOCUMENTS

| | | |
|---|---|---|
| 3,737,884 | 6/1973 | Wallace ................. 360/2 |
| 3,831,188 | 8/1974 | Zupancic et al. .......... 360/88 |
| 4,181,920 | 1/1980 | Cerekas ................. 360/88 |
| 4,377,828 | 3/1983 | Hayman et al. .......... 360/2 |
| 4,537,125 | 8/1985 | Gaucher ............... 101/93.04 |
| 4,613,877 | 9/1986 | Spencer et al. .......... 346/108 |

Primary Examiner—Raymond F. Cardillo
Assistant Examiner—Surinder Sachar
Attorney, Agent, or Firm—Christie, Parker & Hale

[57] ABSTRACT

Apparatus for processing vouchers includes a drive system suitable for causing a magnetic track on a voucher to pass over a magnetic head (170) which is connected to circuits for controlling writing and including a data transfer unit (22) and a data modulator (23). The stepper motor (185) has at least five phases, and the same clock (21) is used to control the stepper motor (185), the transfer of data from said unit (22), and the data modulator (23) in order to establish control transitions which are applied to the magnetic head.

31 Claims, 3 Drawing Sheets

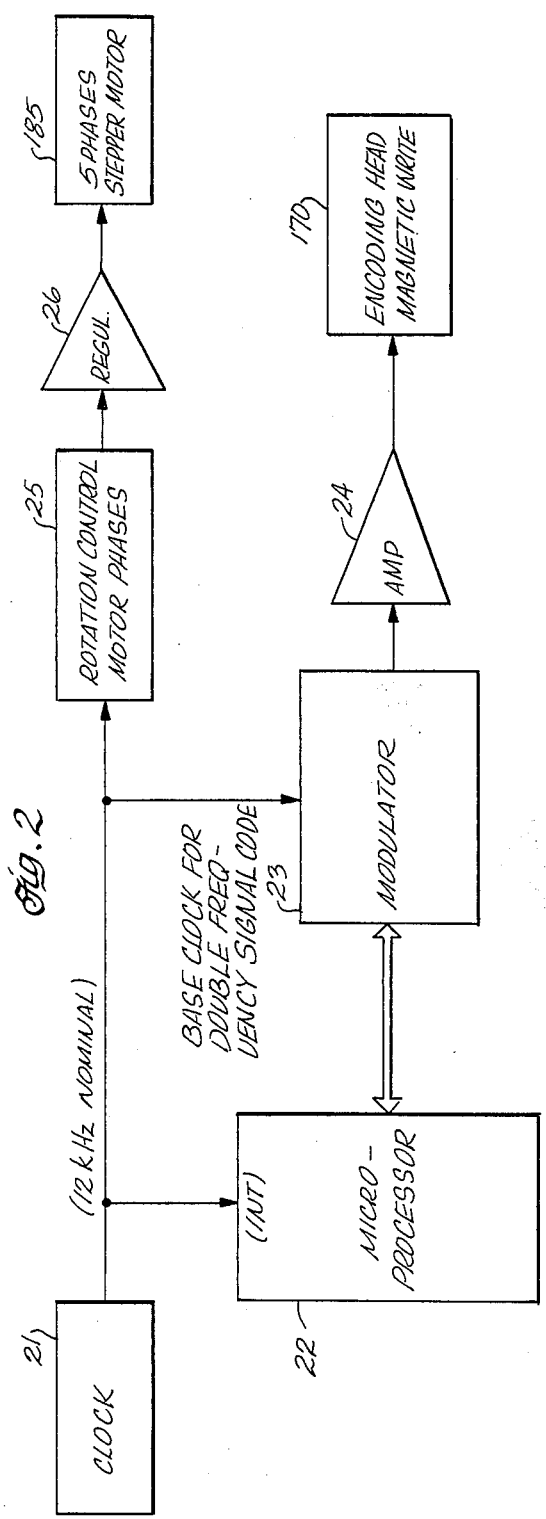
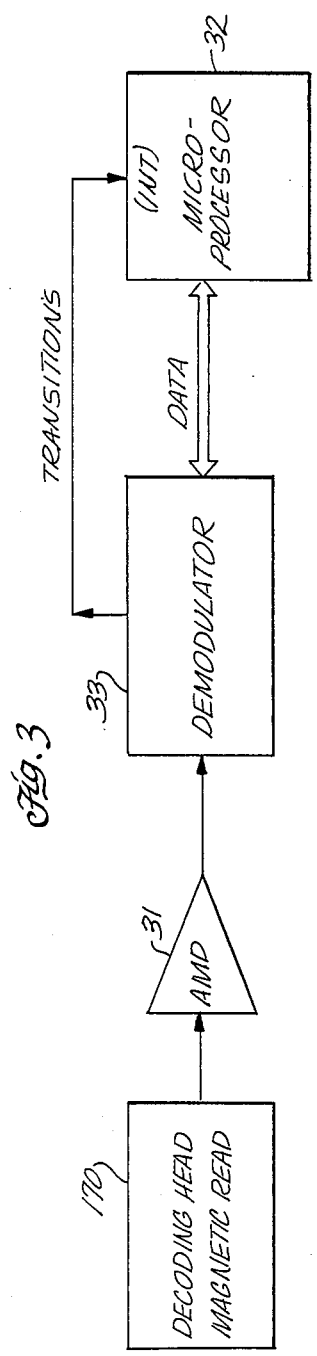

APPARATUS FOR PROCESSING VOUCHERS INCLUDING A HIGH DENSITY MAGNETIC RECORD

The invention relates to apparatus for processing vouchers on paper, card, or the like and it applies in particular to vouchers in which writing is performed on a magnetic track.

Apparatus suitable for writing on the magnetic track of a voucher has been described by the applicant in French patent No. 75 37475 published under No. 2 334 501 and also in French patent application No. 83 11444 published under No. 2 548 804. Other details of apparatus for processing vouchers have been described in French patent application No. 84 10378 published under No. 2,566,941, priority of which is claimed in U.S. patent application, Ser. No. 672,184, filed on Nov. 16, 1984; French patent application No. 84 10379 published under No. 2,566,704; and French patent application No. 84 10380, published under No. 2,566,705, priority of which is claimed in U.S. patent application Ser. No. 672,185, filed on Nov. 16, 1984.

Some applications, including issuing air travel tickets, require magnetic recording at high density, namely about 83 bits per centimeter (210 bits per inch). The distance between two magnetic flux transitions on the track is then reduced to about 60 micrometers.

This poses a problem since in order to ensure that the magnetic track is subsequently read correctly, the tolerance on the position of each magnetic flux transition must be made as small as possible. This tolerance must not exceed ± 6 micrometers or ±8% for the above-mentioned recording density. The applicant has already proposed using a belt driven by a stepper motor for displacing a voucher or ticket along an internal path which includes apparatus for processing said voucher or ticket (French patent application No. 83 11444 priority of which is claimed in U.S. Pat. No. 4,537,125). A second belt driven from the first by friction with the voucher (when present) being pinched between said belts drives said voucher in such a manner that its magnetic track passes opposite a magnetic write/read head.

It is important to obtain a linear voucher displacement speed which is both high and constant, both to write or encode high density data and also to read or decode such data. When reading, the amplitude of the signal detected by the decoding head increases with increasing speed thereby increasing the signal-to-noise ratio and thus the reliability of the decoding.

The Applicant has observed that the known solution using four-phase stepper motors is not capable of operating at high speed to obtain the desired recording density with the required accuracy in the positioning of magnetic flux transitions on the track.

The Applicant has thus investigated the possibilities of operating stepper motors at subdivisions of their elementary steps. Here again it has turned out that the solution is not satisfactory, in particular concerning the desired accuracy on the positioning of the magnetic flux transitions.

In order to obtain high speed, it has appeared to be necessary for the drive mechanism to have a low resisting couple, and in particular that the mechanical members of the motor should have low resisting couple, and these members should be controlled by current regulation from a high voltage.

It is also necessary for the stepper motor to be able to withstand without loss of synchronism both the initial acceleration phase and the final deceleration phase which occur on either side (in time) of its nominal speed phase during the operations of writing or reading on a magnetic track; in order to make this possible, it is important for the mechanism to have minimal inertia.

The present invention seeks to provide a satisfactory solution to the above-described problem.

The present invention provides apparatus for processing vouchers of the type comprising voucher drive means using at least one belt driven by a stepper motor, said drive means being suitable for causing a magnetic track on the voucher to pass over a magnetic head which is connected to write control circuits which themselves include a data transfer unit and a data modulator.

According to a first characteristic of the invention the stepper motor has at least five phases, and the same clock is used for controlling the stepper motor, for controlling the transfer of data by said unit, and for controlling the data modulator to establish the control transitions applied to the magnetic head.

This makes it possible to provide a high density magnetic recording with high accuracy on the magnetic flux transitions written to the track.

According to another aspect of the invention, the mechanical connection between the stepper motor and the belt is established in such a manner that the belt has a nominal linear speed of at least 0.5 meters per second. The clock frequency is at least 10 kHz.

More particularly, the stepper motor possesses at least 500 steps per turn and it drives the toothed belt by means of a gear wheel mounted on its shaft and having a diameter equal to or less than about 1 centimeter.

According to another aspect of the invention, the modulator operates using a double frequency code based on the base clock signal which is applied thereto.

According to yet another aspect of the invention, the stepper motor is brought up to speed by means of an acceleration/deceleration curve generated by software, and phase control signals are generated by means of a read only memory (ROM) programmed with the appropriate sequence.

Other characteristics and advantages of the invention will appear from the following detailed description, and from the accompanying drawings, in which:

FIG. 2 is a block diagram of the electronic portion of apparatus in accordance with the invention concerning magnetic writing;

FIG. 3 is a diagram of the electronic portion of apparatus in accordance with the invention for magnetic reading;

Figure 1:
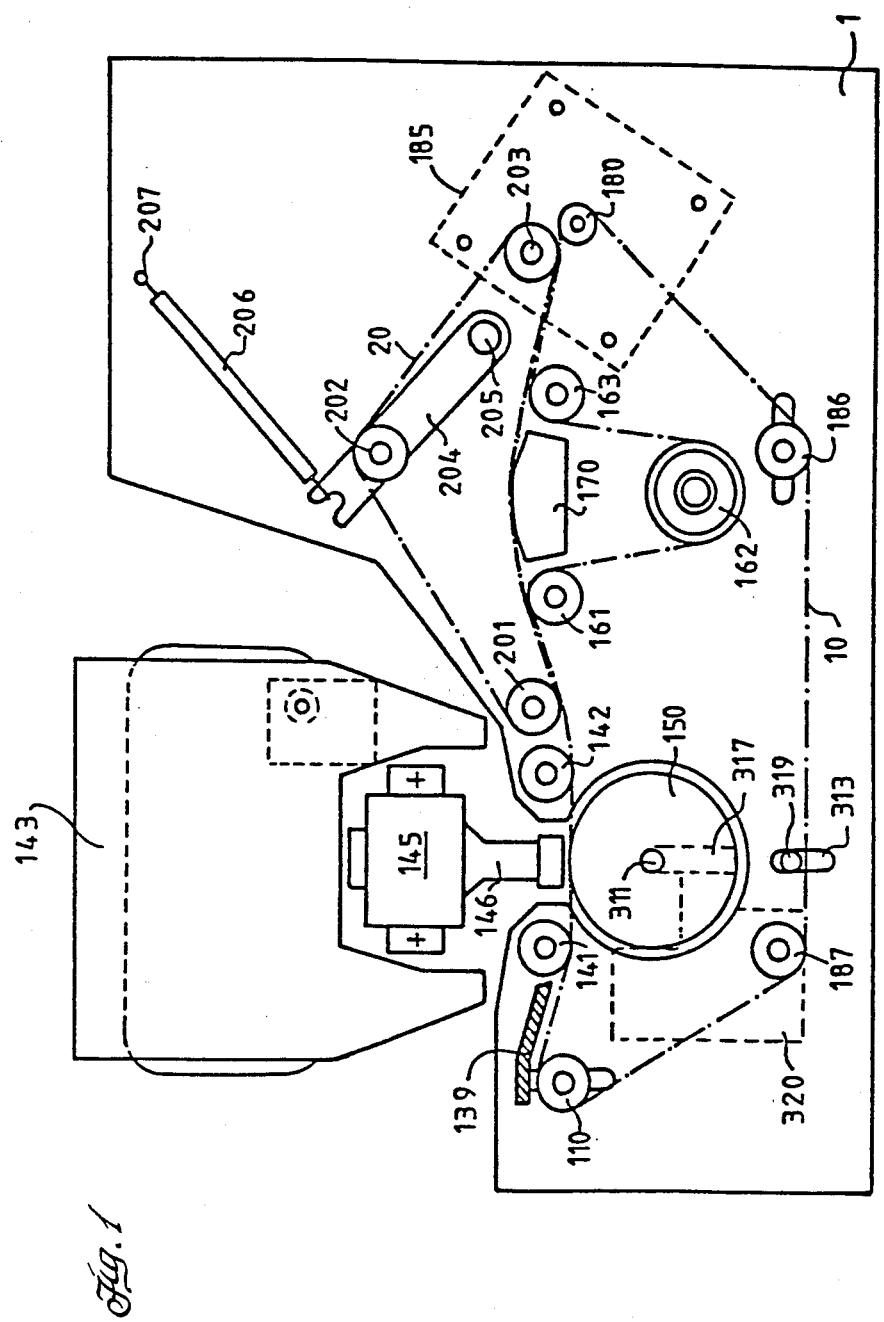
FIG. 1 is a side view of the mechanical portion of apparatus in accordance with the invention.

Reference is made initially to FIG. 1.

The general structure of the apparatus shown is similar to that described in above-mentioned patent application No. 83 11444 (U.S. Pat. No. 4,537,125). It includes the improvement described in French patent application No. 84 10380 (U.S. application Ser. No. 672,185). Wherever possible, the reference numerals used in the drawings of these two prior patent applications have been retained.

A toothed belt 10 follows a closed circuit around wheels 110, 141, 142, 161, 162, 163, 180, 186 and 187. The wheel 180 is toothed and mounted on the shaft of a stepper motor 185. The tension of the belt 10 is adjustable, for example by displacing the wheel 186.

The voucher or air ticket to be processed is inserted at the wheel 110 where it is engaged, for example, between the belt which rotates over the wheel 110 and a plate 139. Different variants concerning the insertion of the voucher can be found in the above-mentioned patents and patent applications.

An internal path is defined for the air ticket running from the wheel 110 to the wheel 180.

The apparatus as a whole is mounted on a carrier plate referenced 1, with the upper left-hand portion removed to clarify the figure.

Between the wheel 141 and 142 the ticket passes through a print station. This is constituted by a dot matrix print head 145 whose pin channel is referenced 146. This station is associated with a ribbon spool 143.

The belt passes over a cylindrical roller 150 which constitutes a printing anvil in such a manner as to be level with the surface thereof. A central bore through the roller 150 receives a rod 311 which constitutes a first guide for displacement in translation of the print head 145, 146 and the spool 143 transversally to the plane of FIG. 1. A second guide is provided by another rod 319 which passes through a hollow 313 of the carrier plate 1 and co-operates with two wheels (not shown) which engage said rod 319. The rod 311 has a rack which engages a gear wheel 317 which is fixed to another stepper motor 320. Other details of this assembly are to be found in above-mentioned patent application No. 84 10380 (U.S. application Ser. No. 672,185).

The belt 10 drives the air ticket by friction at the same level as its magnetic track.

After passing through the print station, the air ticket passes through a magnetic write/read station which is essentially constituted by a head 170. The wheels 161, 162 and 163 divert the belt 10 behind the magnetic head.

A second belt 20 follows a closed circuit round a wheel 201 placed upstream from the wheel 161, a wheel 203 placed downstream from the wheel 163, and a wheel 202 mounted on an arm 204 which is fixed at 205 to the carrier plate 1 and which is urged at its other end by a resilient return force defined by a spring 206 connected at 207 to the same carrier plate.

The belt 20 is driven either by direct friction against the belt 10 in those places where they are tangential to one another, or else by friction with the ticket interposed therebetween, when a ticket is present.

The Applicant has observed that providing the belts curve on each wheel through an angle of about 165° then the ticket is very evenly driven without slipping relative to the belts, and without the belts sliding relative to each other. It is thus the stepper motor 185 which defines ticket advance.

Apparatuses of this type implemented so far which use a four phase stepper motor 185 have given satisfaction in various applications, including processing tickets for the Paris metropolitan railway, for example.

However, a difficulty appears when it is necessary to obtain high recording densities of about 83 bits per centimeter as is the case for air tickets, and this is all the more so since the tolerance on the position of the magnetic flux transitions on an air ticket track must not exceed ±8% or ±6 micrometers.

As already mentioned above, the Applicant has tested various solutions which have not proved satisfactory, and in particular the Applicant has tested the solution of subdividing the elementary step of a four phase stepper motor.

Unexpectedly, it appears that a five phase stepper motor, such as the stepper motor available from the German corporation Berger Lahr can be used to satisfy the above requirements provided that the same clock is used for controlling rotation of the motor phases, for controlling the microprocessor which delivers the data to be written on the magnetic track, and for controlling the modulator which provides prior modulation for such writing. In this respect, reference is now made to FIG. 2.

A clock 21 delivers a signal at a frequency of 12 kHz.

The writing edges of the clock produce interrupts in a microprocessor 22 which responds each time by delivering a data item to be recorded to a modulator 23. The modulator also receives the clock frequency of 12 kHz and performs double frequency encoding of the data which it receives from the microprocessor 22.

In this code, a logic "0" is represented by a signal of frequency f whereas a logic "1" is represented by a signal at frequency 2 f.

The output for the modulator is applied to an amplifier 24 which in turn feeds the magnetic head 170.

The same clock is used to control the rotation of the motor phases via stages 25 followed by a current regulator 26 which feeds the five phase stepper motor 185.

It turns out that by choosing the diameter of the wheel 180 taking account of the 500 steps per rotation of a five phase stepper motor of the above type, it is possible to obtain a linear displacement speed for the magnetic track past the magnetic head which is at least 0.5 meters per second, and which is preferably between 0.6 and 1 meters per second. This may be obtained by using a gear wheel 120 having a diameter equal to or less than about 1 centimeter. The pitch of the teeth on the belt should be less than 5 millimeters and preferably is close to 2 millimeters.

It then turns out that excellent synchronization is obtained between sending a data item to be encoded from the microprocessor to the modulator, modulating the said data item by the modulator 23, and displacing the ticket under the effect of the stepper motor 185, and as a result the flux transitions are very accurately positioned on the magnetic track included in an air ticket.

On decoding (see FIG. 3), the decoding head 170 receives the same transitions which are applied to an amplifier 31 followed by demodulator 33 which performs the inverse operations to the modulator 23. The transitions detected by the demodulator 33 control microprocessor interrupts and thus reconstitute the data recorded on the magnetic track.

The person skilled in the art will understand that it is also necessary to be able to accelerate the stepper motor up to its nominal speed and then to decelerate it from this nominal speed to zero speed, and that syncronism must be maintained throughout. This is necessary both for magnetic writing/reading and for printing on the ticket in the clear.

Speed variation during the acceleration and deceleration phases is obtained by varying the base clock of the motor control circuit.

Figure 4:
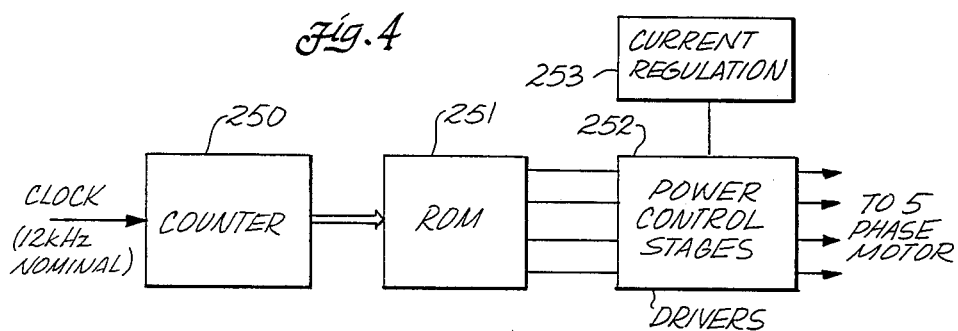
FIG. 4 is a block diagram of a system for controlling the rotation of the phases of the stepper motor.

FIG. 4 shows one embodiment of the motor control circuit by showing the details of the modules 25 and 26 shown in FIG. 2. The frequency of the clock (12 kHz)

under nominal conditions is applied to a counter 250 which addresses a read only memory 251 which is programmed in such a manner as to generate the phase control signals in an appropriate sequence. The output from the read only memory 251 activates power control stages (or "drivers") 252 which feed the five phase motor via current regulation provided by stage 253.

Figure 5:
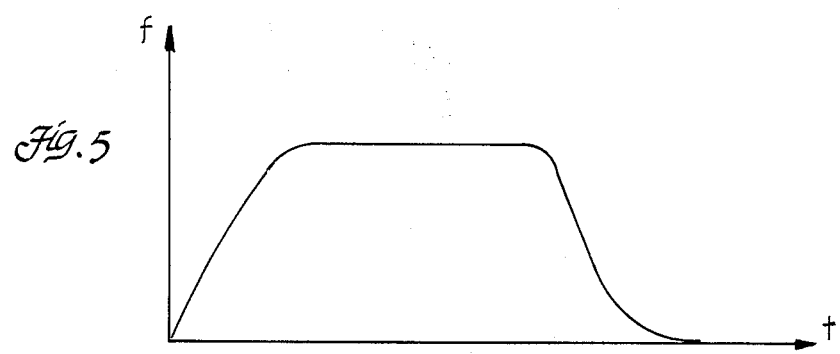
FIGS. 5 and 6 are graphs showing various aspects of apparatus in accordance with the invention.

FIG. 5 shows the shape which work done by the Applicant has demonstrated is desirable for the acceleration and deceleration curves of a stepper motor. Time is plotted along the X axis and the step frequency is plotted along the Y axis. It can be seen that the frequency should initially rise in a substantially exponential manner until it reaches a threshold and that it should subsequently fall from the threshold in a manner which is likewise substantially exponential.

Figure 6:
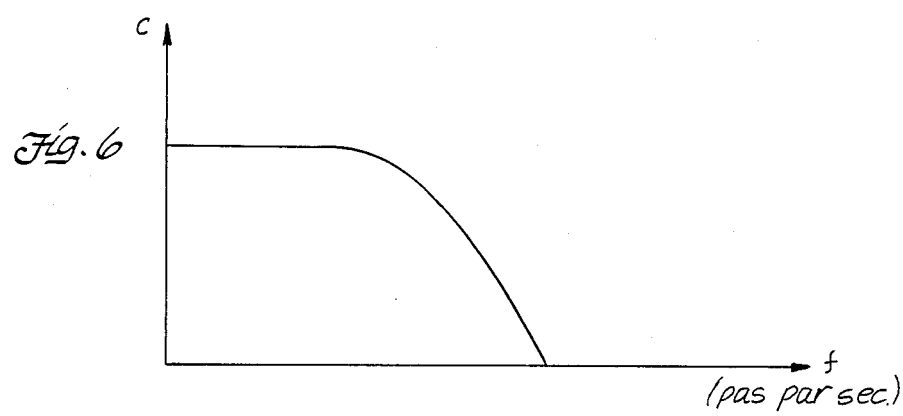

According to another aspect of the invention, and by virtue of the low inertia of apparatus in accordance with the invention, it has appeared that this can be achieved using a five phase stepper motor of the kind presently available. FIG. 6 shows the curve of the couple provided by a five phase stepper motor as a function of the frequency f at which it is advancing, expressed in steps per second.

It is from this kind of curve that it is possible to establish the FIG. 5 graph, and then to determine that a five phase stepper motor is capable of being controlled in a manner which is suitable for apparatus in accordance with the invention in order to obtain the desired magnetic recording density and within the imposed tolerances on the positions of magnetic flux transitions on the track.

The invention also provides another advantage.

In known devices using a four phase stepper motor, noise is generated which is disagreeable to the ear both in frequency and in level.

Apparatus in accordance with the invention considerably reduce this by:
changing the frequency from about 1000 Hz to about 10,000 Hz; and
reducing mechanical shocks and jerks.

What is claimed is:

1. Apparatus for processing vouchers, comprising voucher drive means having at least one belt (10, 20) actuated by a stepper motor (185) for causing a magnetic track on the voucher to pass over a magnetic head (170) connected to write control circuits (22, 24) including a data transfer unit (22) and to a data modulator (23) for receiving data from the data transfer unit (22) to control the magnetic head (170), in which the stepper motor (185) has at least five phases; and further including means directly connecting the stepper motor and the belt driving the voucher so that the writing of data items on the voucher by the magnetic head is directly related to the steps of the stepper motor, and control means in which the same clock (21) is used to control the stepper motor (185) rotation phases to control movement of the voucher, to control the transfer of data by said data transfer unit (22) to the data modulator, and to control the data modulator (23) for establishing control of transitions applied to the magnetic head (170) for writing the data items on the voucher, said control means thereby synchronously controlling the data applied to the head, for writing the data items on the voucher, and the displacement of the voucher by the stepper motor so that each transition of the clock to control writing of data items on the voucher represents a corresponding step of the stepper motor, thereby enabling a high density magnetic recording to be obtained with high accuracy on the magnetic flux transitions written on the track.

2. Apparatus according to claim 1, characterized in that the mechanical connection (810) between the stepper motor and the belt is established in such a manner that the belt has a nominal linear speed of at least 0.5 meters per second.

3. Apparatus according to claim 1, characterized in that the clock frequency (21) is at least 10 kHz.

4. Apparatus according to claim 1, characterized in that the stepper motor (185) has at least 500 steps per turn, and in that it drives the toothed belt (10) by means of a gear wheel (180) mounted on its shaft and having a diameter which is equal to or less than 1 cm.

5. Apparatus according to claim 1, characterized in that the modulator (23) provides double frequency encoding from the base clock signal (21) which is applied thereto.

6. Apparatus according to claim 1, characterized in that the stepper motor (185) is controlled via a programmed acceleration/deceleration circuit (250–253).

7. Apparatus according to any preceding claim, characterized in that the voucher drive means comprise a first belt (10) wound in a closed loop over wheels (110, 141, 142, 161, 162, 163, 180, 186, and 187) and which co-operates with the voucher over a fraction of the width thereof substantially level with its magnetic track, said first belt being diverted (162) in the vicinity of the magnetic head (170), where the voucher is urged towards the magnetic head (170) by a second belt (20) which co-operates by friction with the first.

8. Apparatus according to claim 1, characterized in that the belt also causes the voucher to pass through a station for printing thereon in the clear (145, 146, 150).

9. Apparatus according to claim 1, characterized in that the pitch of the teeth on the belt (10) is less than 5 mm, and preferably 2 mm.

10. Apparatus according to claim 2, characterized in that the stepper motor (185) has at least 500 steps per turn, and in that it drives the toothed belt (10) by means of a gear wheel (180) matted on its shaft and having a diameter which is equal to or less than 1 cm.

11. Apparatus according to claim 3, characterized in that the stepper motor (185) has at least 500 steps per turn, and in that it drives the toothed belt (10) by means of a gear wheel (180) matted on its shaft and having a diameter which is equal to or less than 1 cm.

12. Apparatus according to claim 2, characterized in that the modulator (23) provides double frequency encoding from the base clock signal (21) which is applied thereto.

13. Apparatus according to claim 3, characterized in that the modulator (23) provides double frequency encoding from the base clock signal (21) which is applied thereto.

14. Apparatus according to claim 4, characterized in that the modulator (23) provides double frequency encoding from the base clock signal (21) which is applied thereto.

15. Apparatus according to claim 2, characterized in that the stepper motor (185) is controlled via a programmed acceleration/deceleration circuit (250–253).

16. Apparatus according to claim 3, characterized in that the stepper motor (185) is controlled via a programmed acceleration/deceleration circuit (250–253).

17. Apparatus according to claim 4, characterized in that the stepper motor (185) is controlled via a programmed acceleration/deceleration circuit (250-253).

18. Apparatus according to claim 5, characterized in that the stepper motor (185) is controlled via a programmed acceleration/deceleration circuit (250-253).

19. Apparatus according to claim 2, characterized in that the belt also causes the voucher to pass through a station for printing thereon in the clear (145, 146, 150).

20. Apparatus according to claim 3, characterized in that the belt also causes the voucher to pass through a station for printing thereon in the clear (145, 146, 150).

21. Apparatus according to claim 4, characterized in that the belt also causes the voucher to pass through a station for printing thereon in the clear (145, 146, 150).

22. Apparatus according to claim 5, characterized in that the belt also causes the voucher to pass through a station for printing thereon in the clear (145, 146, 150).

23. Apparatus according to claim 6, characterized in that the belt also causes the voucher to pass through a station for printing thereon in the clear (145, 146, 150).

24. Apparatus according to claim 7, characterized in that the belt also causes the voucher to pass through a station for printing thereon in the clear (145, 146, 150).

25. Apparatus according to claim 2, characterized in that the pitch of the teeth on the belt (10) is less than 5 mm, and preferably 2 mm.

26. Apparatus according to claim 3, characterized in that the pitch of the teeth on the belt (10) is less than 5 mm, and preferably 2 mm.

27. Apparatus according to claim 4, characterized in that the pitch of the teeth on the belt (10) is less than 5 mm, and preferably 2 mm.

28. Apparatus according to claim 5, characterized in that the pitch of the teeth on the belt (10) is less than 5 mm, and preferably 2 mm.

29. Apparatus according to claim 6, characterized in that the pitch of the teeth on the belt (10) is less than 5 mm, and preferably 2 mm.

30. Apparatus according to claim 7, characterized in that the pitch of the teeth on the belt (10) is less than 5 mm, and preferably 2 mm.

31. Apparatus according to claim 8, characterized in that the pitch of the teeth on the belt (10) is less than 5 mm, and preferably 2 mm.

* * * * *